United States Patent
Nakamura et al.

(10) Patent No.: US 8,569,981 B2
(45) Date of Patent: Oct. 29, 2013

(54) MOTOR DRIVE AND ELECTRIC POWER STEERING APPARATUS USING THE SAME

(75) Inventors: Kouichi Nakamura, Kariya (JP);
Yasuhiko Mukai, Kariya (JP);
Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 396 days.

(21) Appl. No.: 12/977,489

(22) Filed: Dec. 23, 2010

(65) Prior Publication Data
US 2011/0156627 A1    Jun. 30, 2011

(30) Foreign Application Priority Data

Dec. 25, 2009 (JP) ................ 2009-295534
Nov. 5, 2010 (JP) ................ 2010-248185

(51) Int. Cl.
*H02P 21/00* (2006.01)
(52) U.S. Cl.
USPC .................... 318/400.02; 318/432
(58) Field of Classification Search
USPC ............. 318/139, 400.02, 432, 434
See application file for complete search history.

(56) References Cited

U.S. PATENT DOCUMENTS

| | | | | |
|---|---|---|---|---|
| 6,158,553 A * | 12/2000 | Oshima et al. | ................ | 187/293 |
| 6,232,731 B1 * | 5/2001 | Chapman | ................ | 318/801 |
| 6,992,448 B2 | 1/2006 | Fujimoto et al. | | |
| 7,277,304 B2 * | 10/2007 | Stancu et al. | ................ | 363/71 |
| 7,439,697 B2 * | 10/2008 | Miyazaki et al. | ........ | 318/400.41 |
| 2005/0073273 A1 * | 4/2005 | Maslov et al. | ................ | 318/437 |
| 2007/0176577 A1 * | 8/2007 | Kezobo et al. | ................ | 318/807 |
| 2009/0021207 A1 * | 1/2009 | Kezobo et al. | ................ | 318/798 |

FOREIGN PATENT DOCUMENTS

| | | |
|---|---|---|
| JP | 10-191677 | 7/1998 |
| JP | 2005-304119 | 10/2005 |
| JP | 2005-312234 | 11/2005 |

OTHER PUBLICATIONS

Office Action (2 pages) dated Jan. 22, 2013 issued in corresponding Japanese Application No. 2010-277966 and English translation (2 pages).

* cited by examiner

*Primary Examiner* — Rina Duda
(74) *Attorney, Agent, or Firm* — Nixon & Vanderhye PC

(57) ABSTRACT

In a multi-system motor drive apparatus, a power supply relay is interrupted when a first power supply system fails at time t0. A power control unit doubles a current supplied to an inverter of a second power supply system thereby to supplement the electric power, which has been supplied by an inverter of the first power supply system. The total output of inverters is thus maintained before and after the failure. After an elapse of a predetermined period, the electric power supplied by the second power supply system is reduced gradually so that the inverter of the second power supply system will not be operated to supply the doubled power for a long period.

13 Claims, 13 Drawing Sheets

US 8,569,981 B2

MOTOR DRIVE AND ELECTRIC POWER STEERING APPARATUS USING THE SAME

CROSS REFERENCE TO RELATED APPLICATION

This application is based on and incorporates herein by reference Japanese Patent Applications No. 2009-295534 filed on Dec. 25, 2009 and No. 2010-248185 filed on Nov. 5, 2010.

FIELD OF THE INVENTION

The present invention relates to a motor drive apparatus including a plurality of inverters and an electric power steering apparatus using the same.

BACKGROUND OF THE INVENTION

Patent document 1 discloses a conventional motor drive apparatus, which has a plurality of (for example, two) electric power supply sources such as inverters. When one of the inverters fails in this motor drive apparatus, supply of power from an abnormal inverter, which failed, to a plurality of winding sets of an electric motor is stopped and, instead, the power is supplied to the corresponding winding sets from the normal inverter other than the abnormal inverter. The motor is thus operated continuously by only the normal inverter, even when a part of the inverters fails.

Patent document 1: JP 2005-304119A

In the conventional apparatus according to patent document 1, the output of the abnormal inverter drops at the same time as the failure arises, when the supply of power to an abnormal power supply system is stopped at the time of detection of failure. As a result, the operation of the apparatus changes suddenly immediately after the failure. In case that the motor drive apparatus is applied to an electric power steering apparatus of a vehicle, for example, a sudden change in the output of the motor arises against a driver's normal steering operation.

If the loss of the output is compensated continuously by the operation of the other normal set to reduce the sudden change, the inverter in the normal power supply system overheats because of excessive load current. The motor drive apparatus is likely to be damaged by this heat. If the electric power capacity of the inverter is increased to reduce overheating, the inverter will have to be sized large and become costly. It is thus not possible to provide a motor drive apparatus, which is small in size and low in cost.

SUMMARY OF THE INVENTION

It is therefore an object of the present invention to provide a motor drive apparatus, which reduces changes in operation caused by stopping operation of an abnormal power supply system when any one of a plurality of power supply systems fails.

It is another object of the present invention to provide a motor drive apparatus, which reduces damage caused by heat by gradually changing electric power compensated by an inverter in a normal power supply system and shortening a period of excessive loading, in small size and low cost.

According to the present invention, a motor drive apparatus is provided for driving a motor with electric power supplied by a DC power source. The motor drive apparatus comprises a plurality of power supply systems, a failure check unit, a power supply interruption unit and a power control unit. Each of the plurality of power supply systems includes an inverter for converting the electric power of the DC power source to AC power and a winding set of the motor for receiving the AC power from the inverter. The failure check unit is configured to check whether the plurality of power supply systems includes a failure system, in which at least one of the inverter and the winding set is in failure. The power supply interruption unit is configured to interrupt supply of power from the DC power source to the inverter of the failure system in response to failure determination by the failure check unit. The power control unit is configured to supply the electric power to the inverter based on an input current command value at a normal operation time. The power control unit is further configured to control the inverter of a normal system, which is other than the failure system in the plurality of power supply systems, to supplement electric power, which the failure system has supplied, by the inverter of the normal system, when the power supply interruption unit interrupts the power supply to the inverter of the failure system. The power control unit is further configured to control the inverter of the normal system to gradually change the electric power supplied by the inverter of the normal system after supplementing the power supply is started.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Embodiments of the present invention will be described in detail below. As shown in FIGS. 1 to 13, the embodiments of the present invention are applied to an electric motor-driven power steering apparatus, which assists steering operation of the vehicle.

Figure 1:
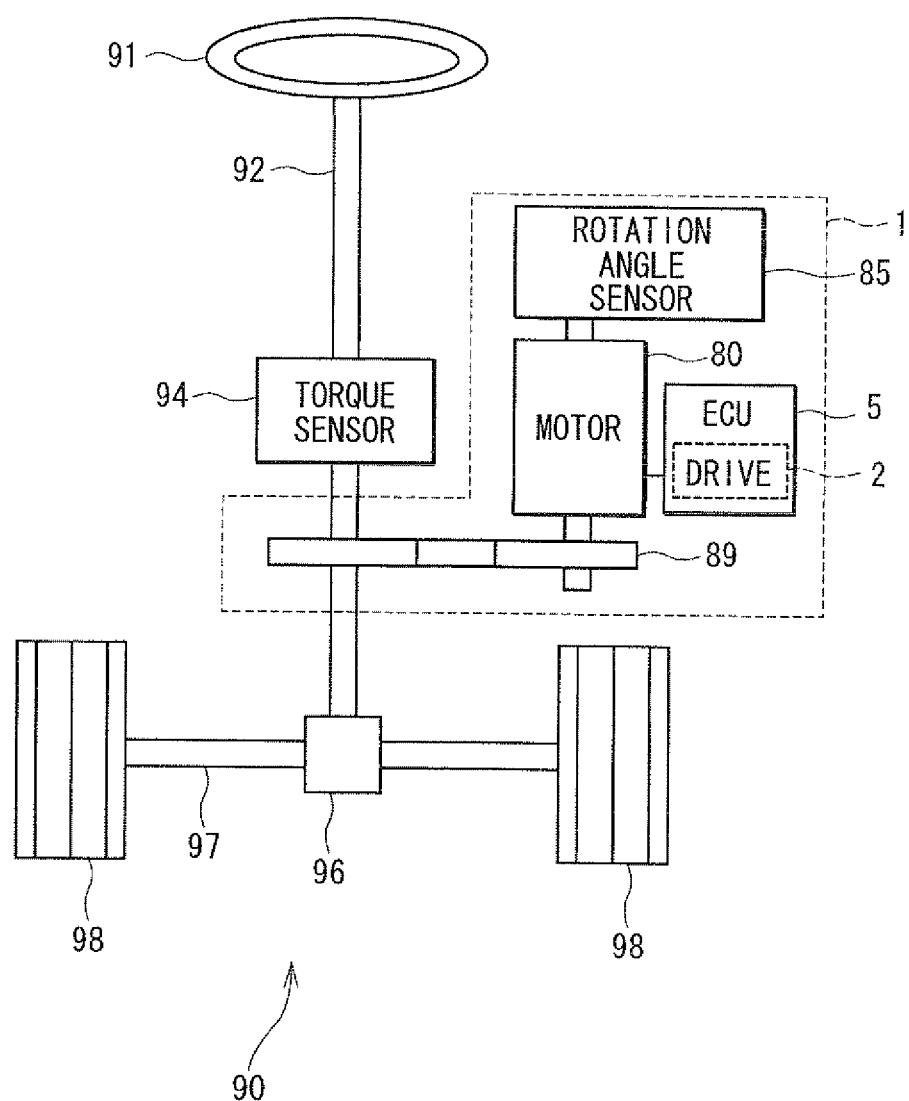
FIG. 1 is a schematic illustration of an electric power steering apparatus, to which a motor drive apparatus according to a first to a third embodiments are applied.

The first to the third embodiments have the same configurations in many aspects. That is, as shown in FIG. 1, an electric power steering apparatus 1 is provided in a steering apparatus 90 of a vehicle. In the steering apparatus 90, a torque sensor 94 is attached to a steering shaft 92, which is coupled to a steering wheel 91 for detecting a steering torque. A pinion gear 96 is provided on the top end of the steering shaft 92 and in engagement with a rack shaft 97. A pair of tire wheels 98 is coupled to both ends of the rack shaft 97 through tie rods, etc. The tire wheels 98 are rotatable. The rotary motion of the steering shaft 92 is translated to a linear motion of the rack shaft 97. The pair of tire wheels 98 is steered by an angle, which corresponds to a change in the linear motion of the rack shaft 97.

The electric power steering apparatus 1 includes an electronic control unit (ECU) 5, an electric motor 80 for generating a steering assist torque, a rotation angle sensor 85 for detecting the angular position of the motor 80, and a reduction gear 89 for transferring the torque to the steering shaft 92 by speed-reducing the rotation of the motor 80. The ECU 5 includes a motor drive apparatus 2, which controls drive of the motor 80. The motor 80 is a three-phase brushless motor and configured to rotate the reduction gear 89 in the forward or rearward direction. With this configuration, the electric power steering apparatus 1 generates the steering assist torque and transfers it to the steering shaft 92 thereby to power-assist steering of the steering wheel 91.

Figure 2:
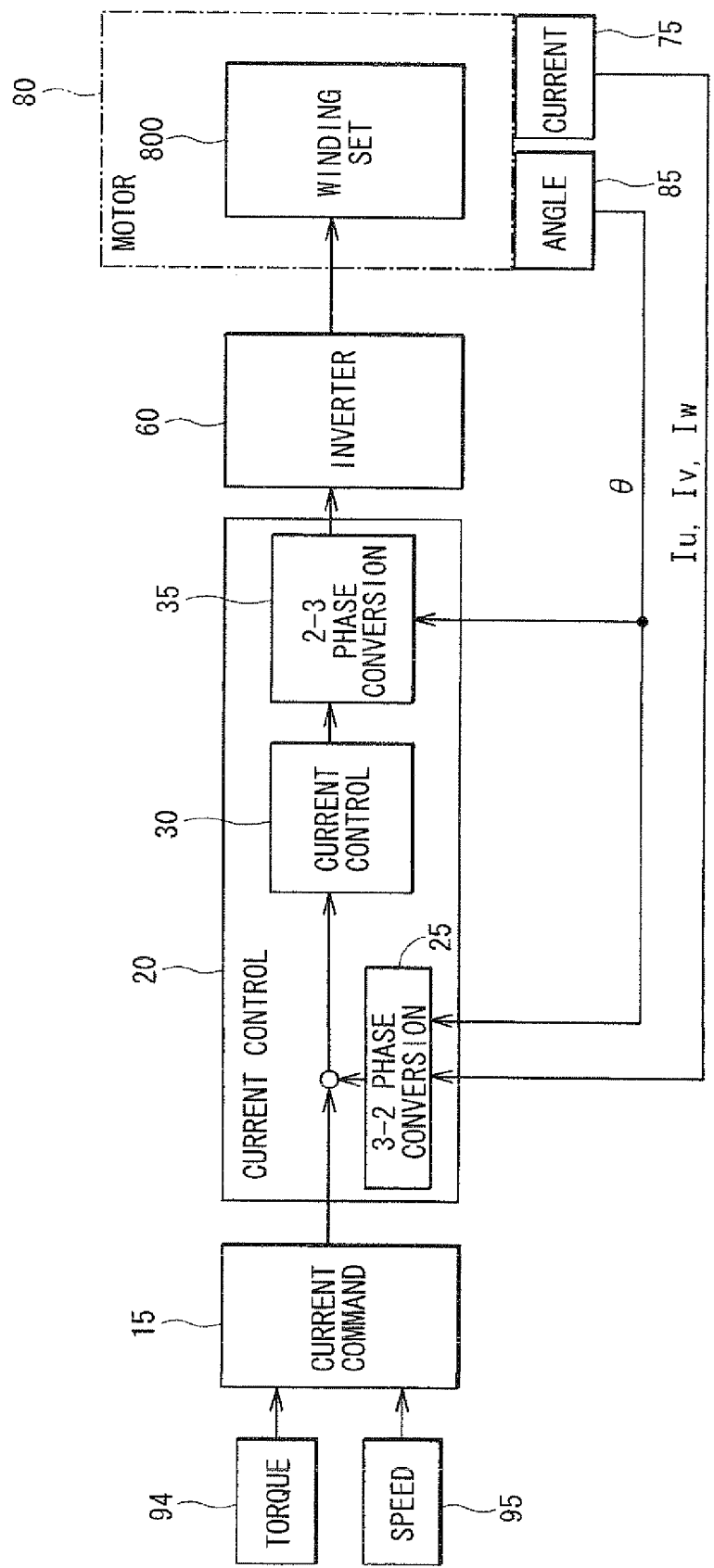
FIG. 2 is a block diagram of the motor drive apparatus according to the first to the third embodiments.

The electric power steering apparatus 1 is configured functionally as shown in FIG. 2. In FIG. 2, the configuration for normal operation is shown and configuration for failure determination, which will be described later, is not shown.

A detection value of the steering torque detected by the torque sensor 94 and a detection value of the vehicle speed detected by a vehicle speed sensor 95 are inputted to a current command value calculation unit 15. The current command value calculation unit 15 outputs the command value to a current control unit 20, which is a d-q control unit.

The current control unit 20 includes a three-phase to two-phase (3-2) phase conversion section 25, a current control calculation section 30 and a tow-phase to three-phase (2-3) phase conversion section 35. The 3-2 phase conversion section 25 is, for example, a d-q-axis current conversion section. The current control calculation unit 30 performs control calculation by proportional (P) calculation, proportional-integral (PI) calculation, proportional-integral-derivative (PID) calculation and the like.

The 3-2 phase conversion section 25 converts the phase current detection values Iu, Iv and Iw detected by a current sensor 75 to a d-axis current and a q-axis current based on a motor electric angle θ, which is detected by the rotation angle sensor 85 and fed back to the 3-2 phase conversion section 25. The d-axis current is parallel to a direction of magnetic flux. The q-axis current is orthogonal to the direction of the magnetic flux. The d-axis current is referred to as an excitation current or a field current. The q-axis current is referred to a torque current.

The d-axis current and the q-axis current outputted from the 3-2 phase conversion section 25 are fed back to the command values produced from the current command value calculation unit 15. The current control calculation section 30 calculates an output value by performing a proportional-integral control on a difference between the command value and the detection value. A motor electric angle θ detected by the rotation angle sensor 85 is also fed back to the 2-3 phase conversion section 30.

The two-phase voltage command values outputted from the current control calculation section 30 are converted into three-phase (U-phase, V-phase, W-phase) voltage command values by the 2-3 phase conversion section 35 and outputted to an inverter 60. The motor electric angle θ detected by the rotation angle sensor 85 is also fed back to the 2-3 phase conversion section 35. The current control unit 20 may be implemented by a microcomputer.

Alternating current (AC) electric power generated by the inverter 60 is supplied to winding sets 800 of the motor 80. The current sensor 75 detects output currents of the inverter 60 phase by phase. The rotation angle sensor 85 detects the motor electric angle θ.

The current control unit 20 and the inverter 60 thus generally correspond to a motor drive apparatus 2.

Figure 3:
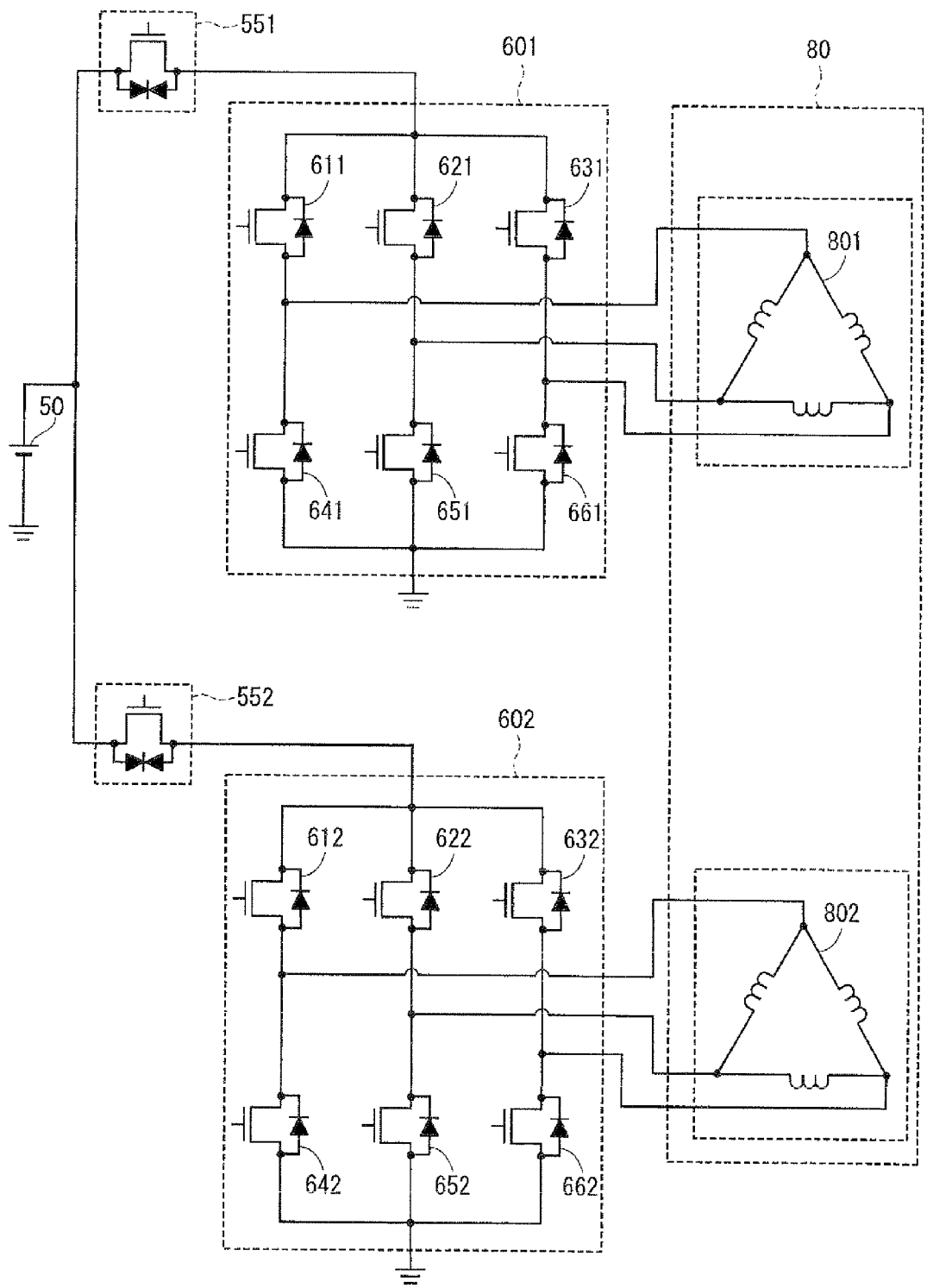
FIG. 3 is a circuit diagram of the motor drive apparatus, which has two power supply systems of power sources, according to the first to the third embodiments.

In case that the motor 80 has a plurality of (for example, two) winding sets 801 and 802, the motor drive apparatus 2 also has the same number of inverters 601 and 602 and the like as exemplarily shown in FIG. 3.

A DC power source 50 is connected to both of a first power supply system (top part in FIG. 3) and a second power supply system (bottom part in FIG. 3). The first power supply system is formed by a first power relay 551, a first inverter 601 and a first motor winding set 801. The second power supply system is formed by a second power relay 552, a second inverter 602 and a second motor winding set 802. The power relays 551 and 552 conduct or interrupt the electric DC power of the battery 50 to the inverters 601 and 602, respectively, as power conduction/interruption unit.

The inverters 601 and 602 generate electric three-phase AC power from the DC power. The motor winding sets 801 and 802 are arranged symmetrically in the motor 80 so that the motor 80 may be driven by the three-phase AC power of the inverters 601 and 602. Each of the motor winding sets 801 and 802 is connected in a Δ-shape in this example. Each of the motor winding sets 801 and 802 may alternatively be connected in a Y-shape. The current sensors 751 and 752 detect the output currents of the inverters 601 and 602, respectively, phase by phase.

Each of the inverters 601 and 602 has six switching elements. Each of the switching elements is a MOS field effect transistors (FET) and referred to simply as a FET. Each EFT at the power source side (high potential side) and the ground side (low potential side) are referred to as a high FET and a low FET, respectively. The six switching elements of the first inverter 601 are a U-phase high FET 611, a V-phase high FET 621, a W-phase high FET 631, a U-phase low FET 641, a V-phase low FET 651 and a W-phase low FET 661. The six switching elements of the second inverter 601 are a U-phase high FET 612, a V-phase high FET 622, a W-phase high FET 632, a U-phase low FET 642, a V-phase low FET 652 and a W-phase low FET 662.

If the motor 80 has more winding sets, more power relays and inverters are provided in parallel to two power relays 551 and 552 and two inverters 601 and 602. A plurality of winding sets and inverters are provided so that the motor 80 may continue to operate with operative systems even when one system become inoperative, that is, one system is in failure.

First Embodiment

Figure 4:
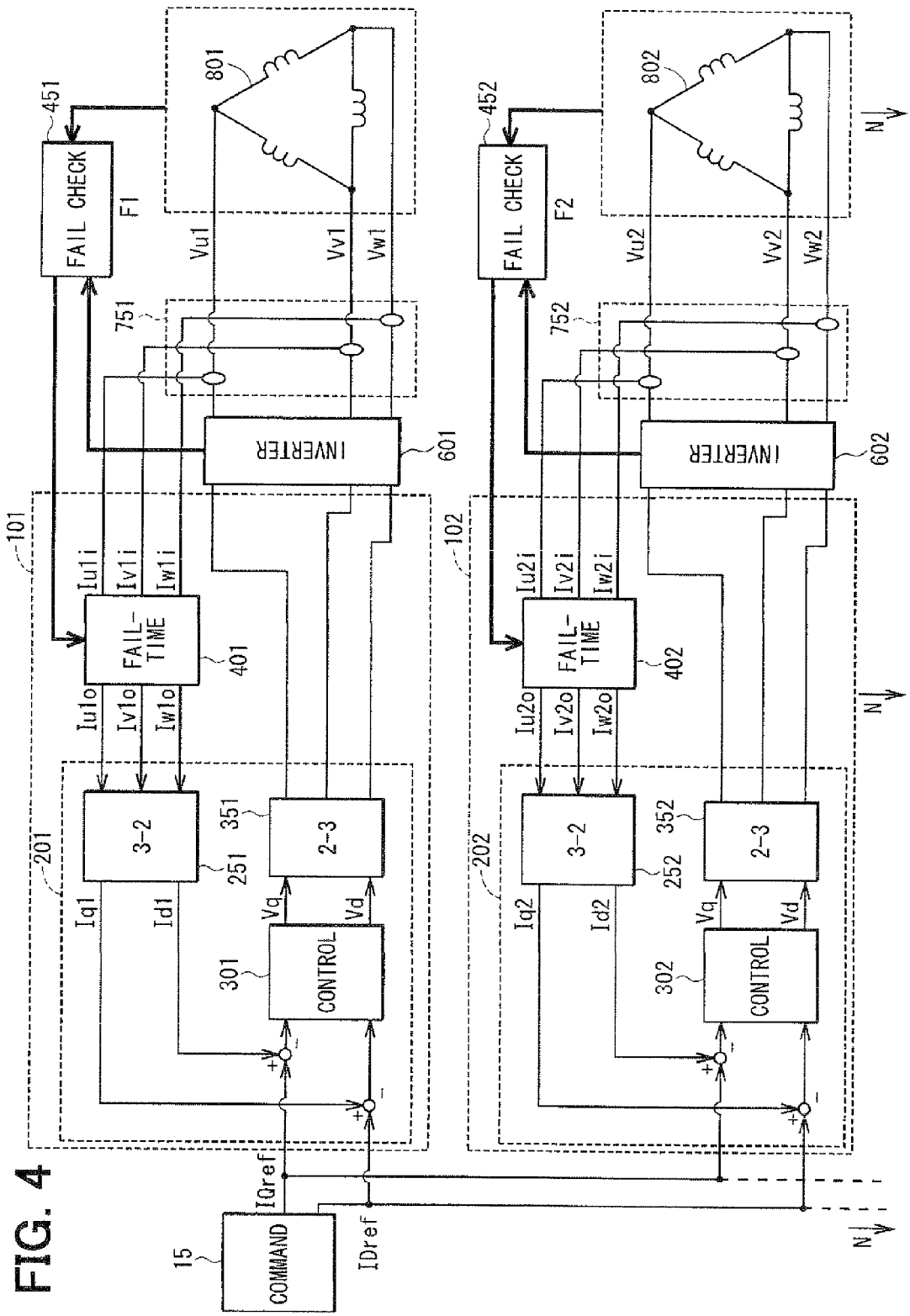
FIG. 4 is a circuit diagram of the motor drive apparatus according to the first and the second embodiments.
Figure 5:
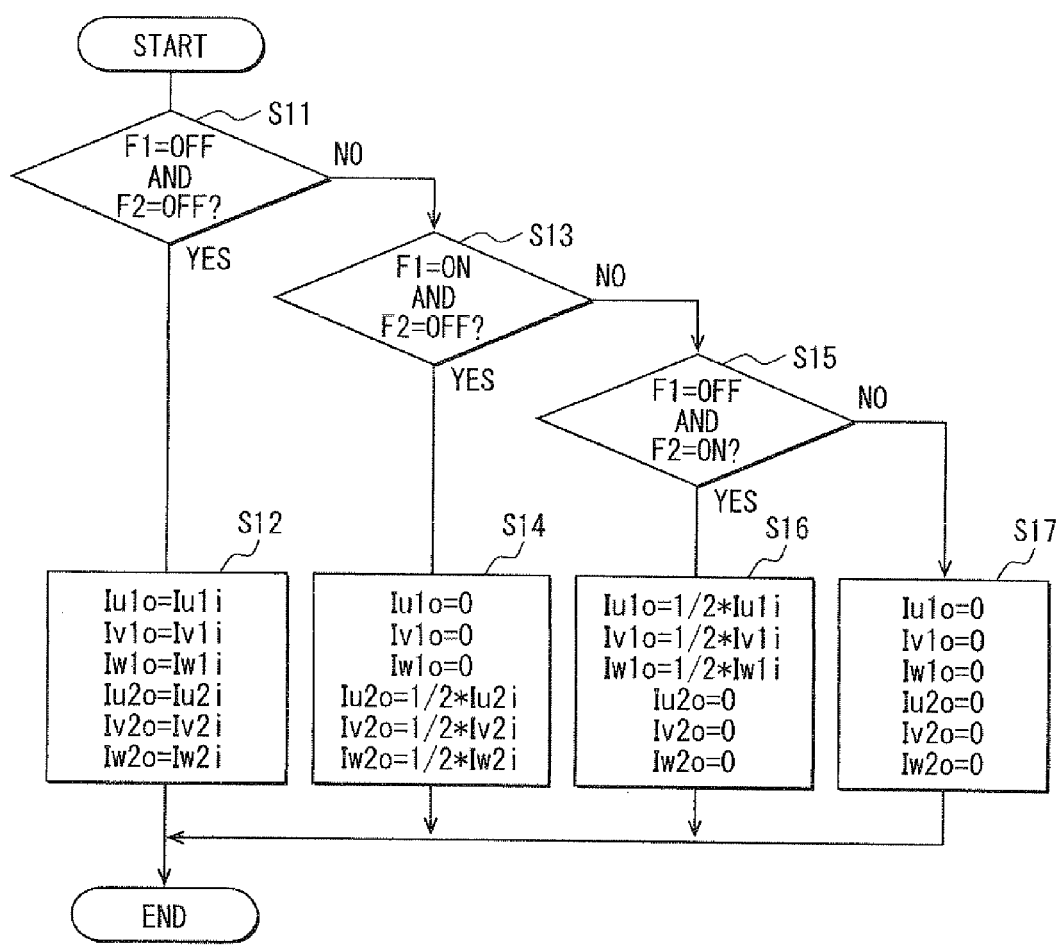
FIG. 5 is a flowchart of failure-time phase current conversion processing executed in the motor drive apparatus according to the first embodiment.
Figure 6:
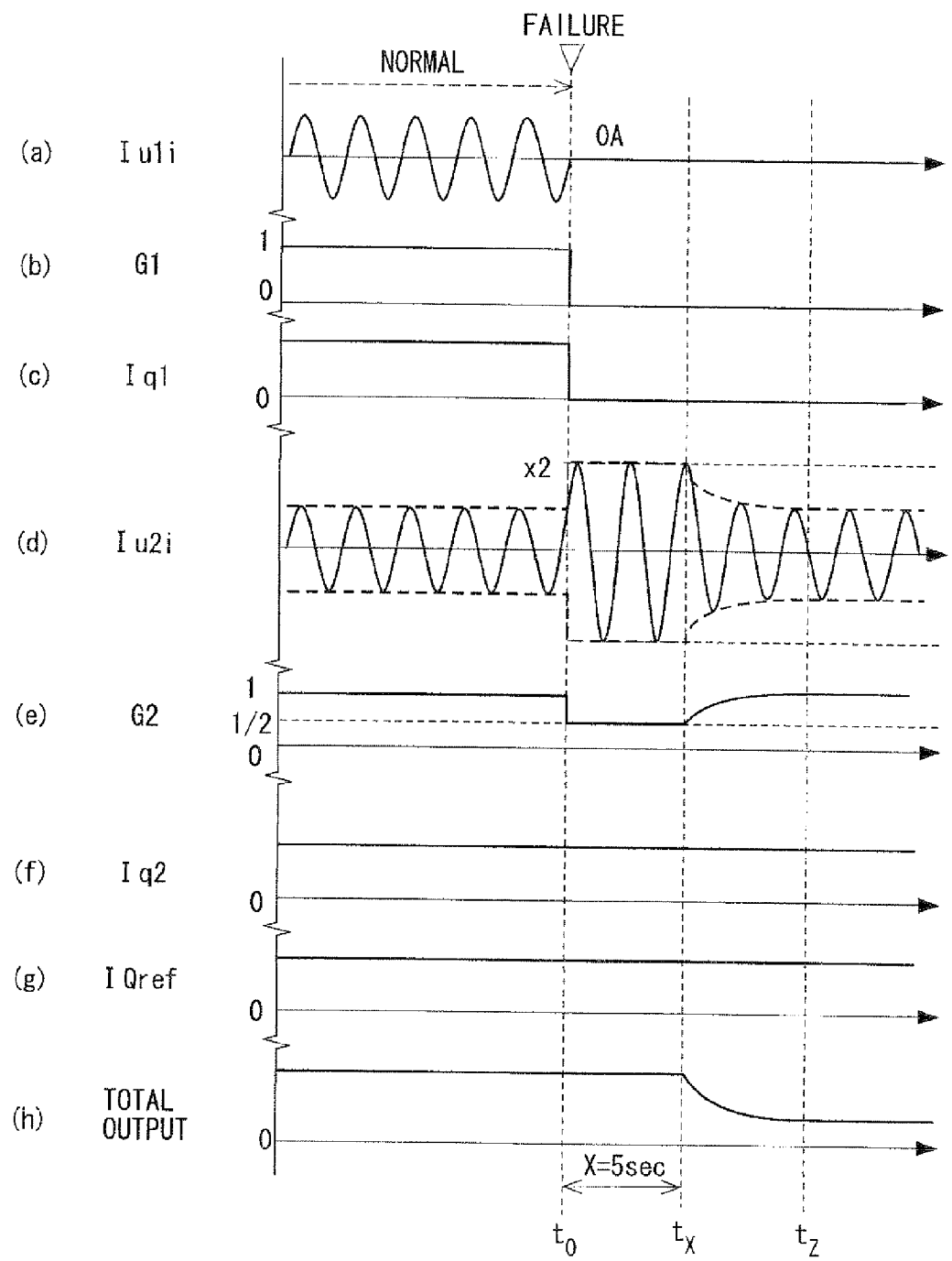
FIG. 6 is a timing diagram of operation performed by the motor drive apparatus according to the first embodiment.

The motor drive apparatus according to the first embodiment is shown in detail in FIGS. 4 to 6.

In FIG. 4, two power supply systems of as many as N power supply systems of the motor drive apparatus are shown exemplarily as the first power supply system and the second power supply system. N is an integer equal to or greater than 2. First and the second electric power control units 101 and 102 are provided for controlling the first and the second inverters 601 and 602, which supply electric power to the motor winding sets 801 and 802, respectively. The first power control unit 101 in the first power supply system includes a first current control unit 201 for the first inverter 601. The second power control unit 102 in the second power supply system includes a second current control unit 202 for the second inverter 602.

In case of N being equal to or greater than 3, more sets of electric power control units may be provided in parallel to the first and the second current control units 101 and 102 as shown by N in the bottom part in FIG. 4.

The operation of the first embodiment is described below with reference to first one of the plurality of power supply systems as an example. The current command value calculation unit 15 outputs a d-axis current command value IDref and a q-axis current command value IQref. A current control calculation section 301 generates representative two-phase voltage command values Vd and Vq based on the d-axis current command value IDref and the q-axis current command value IQref as well as the d-axis current Id and the q-axis current Iq outputted from a 3-2 phase conversion section 251. A 2-3 phase conversion section 351 generates three-phase voltage command values from the two-phase voltage command values Vd and Vq and output such three values to the first inverter 601. The first inverter 601 supplies the three-phase AC voltages Vu1, Vv1, Vw1 to the first winding set 801.

A first current sensor 751 detects the output current of the first inverter 601 and outputs phase current detection values Iu1i, Iv1i, Iw1i to a first failure-time phase current conversion failure check unit 401. A first failure check unit 451 turns off the power relay 551 (FIG. 3) to interrupt the power supply and sets (turns on) a failure flag F1 to F1=ON, when it is determined that at least one of the first inverter 601 and the first winding set 801 is in failure. The failure check unit 451 resets (turns off) the failure flag F1 to F1=OFF, when it is determined that both the first inverter 601 and the first winding set 801 are normal and has no failure. The failure flag F1=ON or F1=OFF is applied to the failure-time phase current conversion section 401 as a failure check signal.

The failure-time phase current conversion section 401 converts the inputted phase current detection values Iu1i, Iv1i and Iw1i to phase current conversion values Iu1o, Iv1o and Iw1o based on the failure check signal, respectively, and outputs such conversion values to the 3-2 phase conversion section 251. The coefficient of this conversion is referred to as a gain, which is a ratio of the phase current conversion value relative to the phase current detection value. The 3-2 phase conversion section 251 performs a coordinate conversion on the phase current conversion values Iu1o, Iv1o, Iw1o and outputs a resulting d-axis current Id1 and a resulting q-axis current Iq1.

The failure-time phase current conversion is executed as shown in FIG. 5, in which S denotes a step.

At S11, it is checked whether the first power supply system is normal (F1=OFF) and the second power supply system is normal (F2=OFF). If the check result is YES, the gains G1, G2 of the first power supply system and the second power supply system are both set to 1 so that the phase current conversion values are set to be equal to the phase current detection values and outputted. If the check result at S11 is NO, S13 is executed.

At S13, it is checked whether the first power supply system is in failure (F1=ON) and the second power supply system is normal (F2=OFF). If the check result at S13 is YES, the gain G1 for the first power supply system is set to 0 at S14 so that the phase current conversion values Iu1o, Iv1o, Iw1o are all set to 0. The gain G2 for the second power supply system is set to ½ so that the phase current conversion values Iu2o, Iv2o, Iw2o are all set to one-half (½) of the phase current detection values Iu2i, Iv2i, Iw2i, respectively. If the check result at S13 is NO, S15 is executed.

At S15, it is checked whether the first power supply system is normal (F1=OFF) and the second power supply system is in failure (F2=ON). If the check result at S15 is YES, the gain G1 for the first power supply system is set to ½ at S16 so that the phase current conversion values Iu1o, Iv1o, Iw1o are all set to one-half (½) of the phase current detection values Iu1o, Iv1i, Iw1i. The gain G2 for the second power supply system is set to 0 so that the phase current conversion values Iu2o, Iv2o, Iw2o are all set to 0.

If the check result at S15 is NO, it is determined that both the first power supply system and the second power supply system are in failure. In this case, both gains G1 and G2 are set to 0 at S17 so that all the phase current conversion values are set to 0.

As exemplified above, in case of failure in one of the two power supply systems, the phase current detection values of the normal power supply system are not used as they are. Rather, the gain G of the normal set is halved (reduced to one-half) and the phase current conversion values are set to one-half of the phase current detection values.

The operation of the first embodiment, in which two power supply systems of electric power control units 101 and 102 (3-2 phase conversion sections 201 and 202) are provided, is shown in FIG. 6. FIG. 6 specifically shows changes in various parameters at the time of failure, assuming that failure arises in the U-phase of the first power supply system. In FIG. 6, it is assumed that the failure check unit 451 determines occurrence of failure at time to. The following description will be made with respect to control in a period from time t0 to time tX. Control after time tx will be described later.

Upon occurrence of failure in the first power supply system, the phase current detection value Iu1i, the gain G1 and the q-axis current Iq1 change as shown by (a), (b) and (c), respectively. When the failure check unit 451 detects a failure in the first inverter 501 or the first winding set 801 at time t0, the power relay 551 turns off to interrupt the power supply of the first power supply system. As a result, the phase current detection value Iu1i changes to 0 as shown by (a). The gain G1 is set to 0 as shown by (b) and the q-axis current Iq1 is set to 0 as shown by (c).

The phase current detection value Iu2i, the gain G2 and the q-axis current Iq2 of the second power supply system, which is assumed to be normal, change as shown by (d), (e) and (f), respectively. When the failure is determined, the second failure-time phase current conversion section 402 halves the gain G2 of the normal power supply system. As a result, the second 3-2 phase conversion section 252 outputs one-half of the phase current detection value Iu2i as the phase current conversion value Iu2o to the second current control calculation section 302. This operation corresponds to a feedback indicating that only one-half of normal current flows in the second power supply system, although the actual phase current detection value Iu2i is normal. That is, the current supplied to the motor by the normal power supply system is presumed to be one-half of the actual detection value. The current control calculation section 302 outputs a command to increase the current to supplement the reduced current. Thus, the phase current Iu2i in the second power supply system is doubled as shown by (d) than that of the normal operation time. Although the phase current detection value Iu2i is doubled after time t0 as shown by (d), the gain G2 is halved as shown by (e). The phase current conversion value Iu2o, which is a product of these values Iu2i and G2, does not change before and after time t0. As a result, the q-axis current Iq2, which is determined by performing the coordinate conversion on the phase current conversion value Iu2o, is not changed as shown by (f).

The q-axis current command value IQref is not changed either as shown by (g). The electric power having been supplied by the first inverter 601 of the first power supply system, which failed, is supplemented by the second inverter 601 of the second power supply system. Thus, the total inverter output provided by the first and the second inverters 601 and 602 is maintained before and after the occurrence of failure as shown by (h). Changes in operation of the motor drive apparatus is thus minimized even upon occurrence of failure. Further, no additional power control unit need be provided separately for the failure time. It is only required to change the input value inputted to the power control unit from the value used in the normal operation. Thus, fail-safe control is implemented by a microcomputer without complication.

In the first embodiment, the motor drive apparatus is assumed to have two power supply systems and one set is assumed to be in failure. With this assumption, the phase current detection value is converted by setting the gain of the normal set to ½.

It is further assumed here that as many as M systems fail to operate normally among a total of N systems. M is an integer, which is equal to or greater than 0 but less than N. N is also an integer equal to or greater than 2. If all the power supply systems are normal, M is 0. When M systems fail among N systems, the gains G of the normal power supply systems are determined to (N−M)/N. The gains G of the normal power supply systems is less than 1 except a case of no failure (M=0). Thus, the 3-2 phase conversion section 25 of the normal power supply system is enabled to recognize that no current flows in other power supply systems and feedback it to the current control calculation section 30. The current control calculation section 30 commands a current of N/(N−M) times, which is an inverse of the gain G, to compensate for the loss of electric power. Since as many as (N−M) systems are normal, a total of the same amount of current as the normal case, in which all N power supply systems are normal, flows. As a result, the total output of the inverters is maintained before and after the occurrence of failure.

Second Embodiment

The motor drive apparatus according to the second embodiment has the same hardware configuration as the first embodiment (FIG. 4). That is, as many as N current control units are provided. However, it is configured to operate differently in part from the first embodiment.

Figure 7:
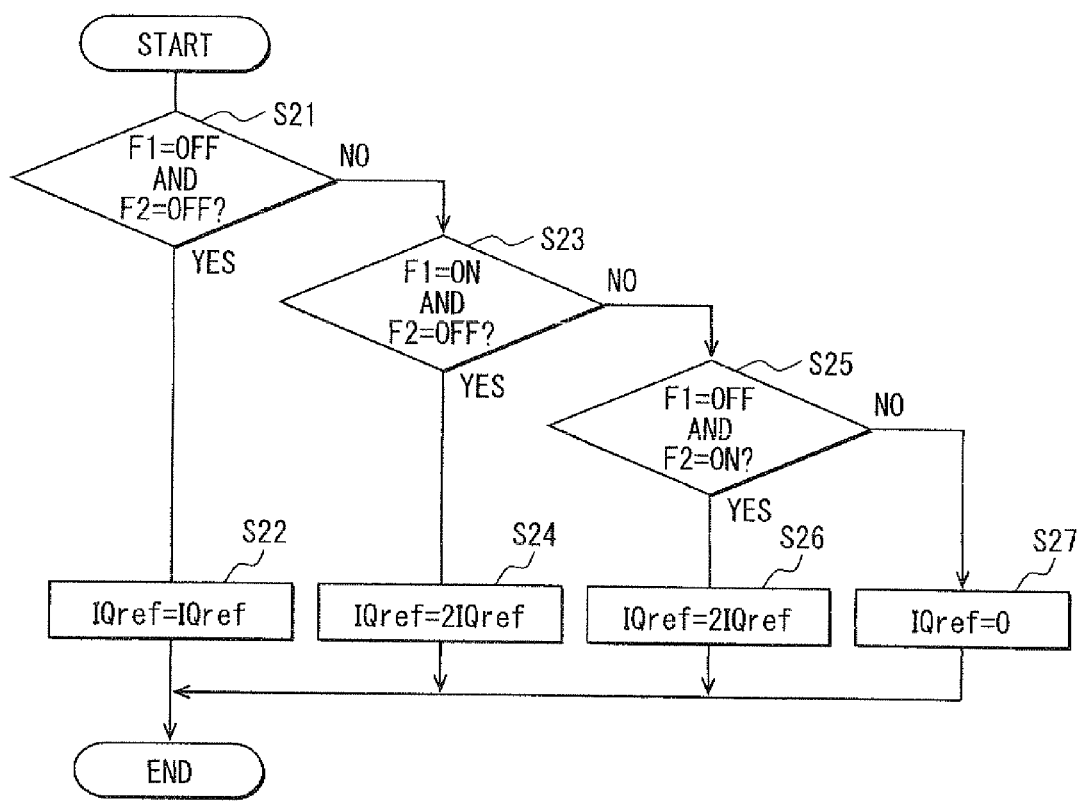
FIG. 7 is a flowchart of failure-time current command value calculation executed by the motor drive apparatus according to the second embodiment.

Specifically, the motor drive apparatus performs the failure-time current command value calculation as shown in FIG. 7 in a case that two current control sections are provided. At S21, it is checked whether the first power supply system is normal (F1=OFF) and the second power supply system is normal (F2=OFF). If the check result is YES, the q-axis current command value IQref is maintained as it is at S22. If the check result is NO, S23 is executed.

At S23, it is checked whether the first power supply system is in failure (F1=ON) and the second power supply system is normal (F2=OFF). If the check result at S23 is YES, the q-axis current command value IQref is doubled at S24. If the check result at S23 is NO, S25 is executed.

At S25, it is checked whether the first power supply system is normal (F1=OFF) and the second power supply system is in failure (F2=ON). If the check result at S25 is YES, the q-axis current command value IQref is doubled at S26 in the similar manner as in S24. If the check result at S25 is NO, it is determined that both the first power supply system and the second power supply system are in failure. In this case, the q-axis current command value IQref is set to 0 at S27.

As exemplified above, in case of failure in one of the two power supply systems, the q-axis current command value IQref is doubled without using the phase current detection value of the set, which is in failure.

Figure 8:
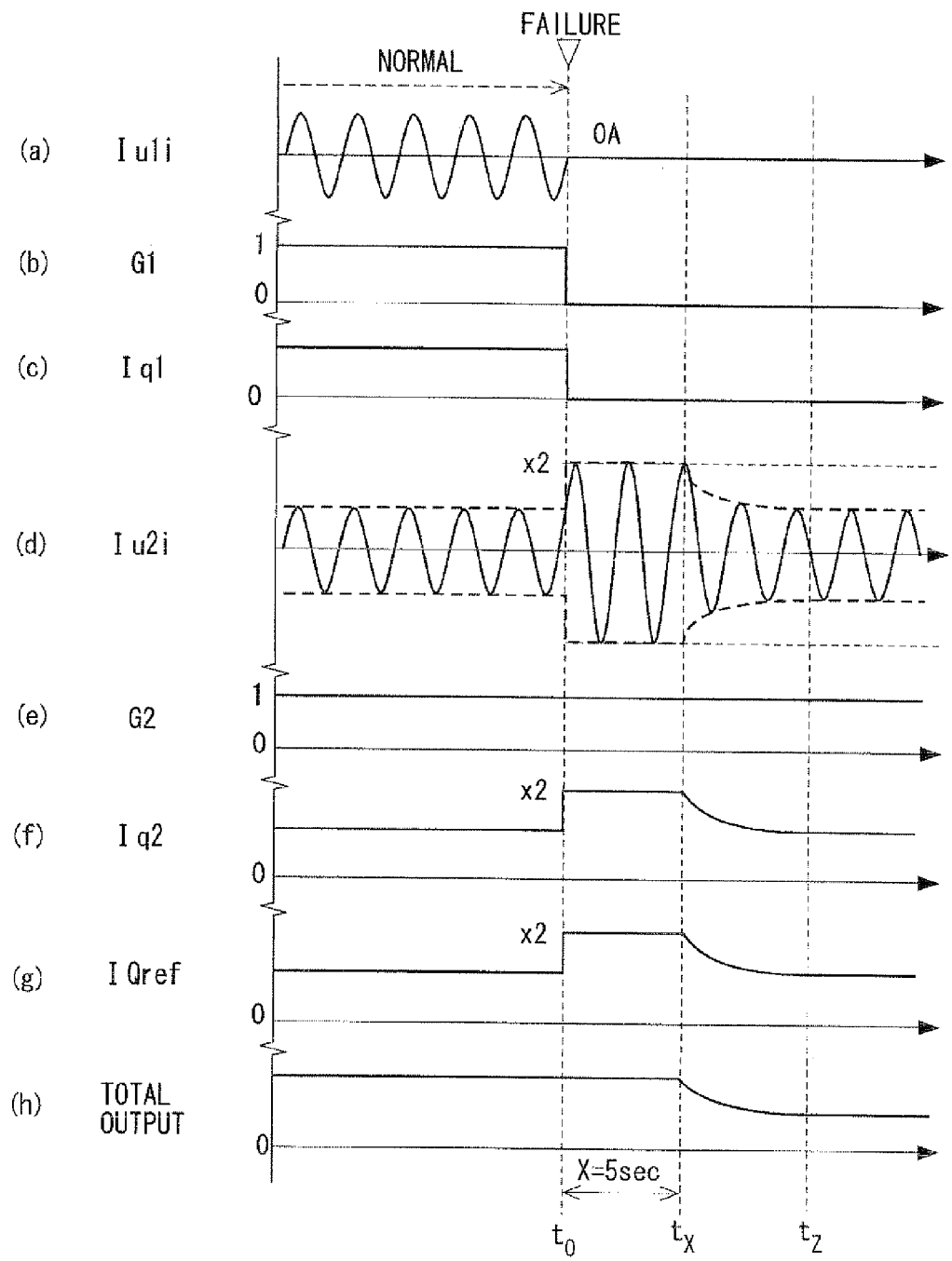
FIG. 8 is a timing diagram of operation performed by the motor drive apparatus according to the second embodiment.

The operation of the second embodiment, in which two power supply systems of electric power control units 101 and 102 (current control units 201 and 202) are provided, is shown in FIG. 8. In correspondence to FIG. 6, FIG. 8 specifically shows changes in various parameters at the time of failure, assuming that failure arises in the U-phase of the first power supply system. In FIG. 8, it is assumed that the failure check unit 451 determines failure at time t0. The following description will be made with respect to control in a period from time t0 to time tX.

Upon occurrence of failure in the first power supply system, the phase current detection value Iu1i, the gain G1 and the q-axis current Iq1 change as shown by (a), (b) and (c), respectively. When the failure check unit 451 detects a failure in the first inverter 601 or the first winding set 801 at time t0, the power relay 551 turns off to interrupt the power supply. As a result, the phase current detection value Iu1i changes to 0 as shown by (a). The gain G1 is set to 0 as shown by (b) and the q-axis current Iq1 is set to 0 as shown by (c). The above operation is the same as in the first embodiment.

The phase current detection value Iu2i, the gain G2 and the q-axis current Iq2 of the second power supply system, which is assumed to be normal, change as shown by (d), (e) and (f), respectively. When the failure is determined by the failure check unit 451, the current control calculation section 302 of the second power supply system doubles the q-axis current command value IQref as shown by (g). Thus, the phase current Iu2i in the second power supply system is doubled as shown by (d) relative to that of the normal operation time (before t0). Since the phase current detection value Iu2i is doubled after time t0 as shown by (d) and the gain G2 is maintained at 1 as shown by (e), the phase current conversion value Iu2o is doubled in comparison to that of before the occurrence of failure at time t0. As a result, the q-axis current Iq2, which is determined by the doubled output value Iu2o by multiplication of the doubled phase current detection value Iu2i and the gain G=1, is doubled as shown by (f).

The electric power having been supplied by the first inverter 601 of the first power supply system, which failed, is supplemented by the second inverter 601 of the second power supply system in the second embodiment as in the first embodiment. Thus, the total inverter output is maintained before and after the occurrence of failure as shown by (h). Changes in operation of the apparatus are thus minimized even upon occurrence of failure. Further, no additional power control unit need be provided separately for the failure time. It is only required to change the input value inputted to the power control unit from the value used in the normal operation. Thus, fail-safe control is implemented by a microcomputer without complication.

In the second embodiment, the motor drive apparatus is assumed to have two power supply systems and one set is assumed to be in failure. With this assumption, the q-axis current command value IQref is doubled.

It is further assumed here that as many as M systems fail to operate normally among as many as N systems. M is an integer, which is equal to or greater than 0 but less than N. N is also an integer equal to or greater than 2. If all the power supply systems are normal, M is 0. When M systems fail among N systems, the q-axis current command value IQref is multiplied by N/(N−M). Thus, a current flows in each normal power supply system by an amount, which is N/(N−M) times of the current flowing in normal operation, Since as many as (N−M) sets are normal, a total of the same amount of current as the normal case, in which all N system are normal, flows. As a result, the total output of the inverters is maintained before and after the occurrence of failure.

Figure 9:
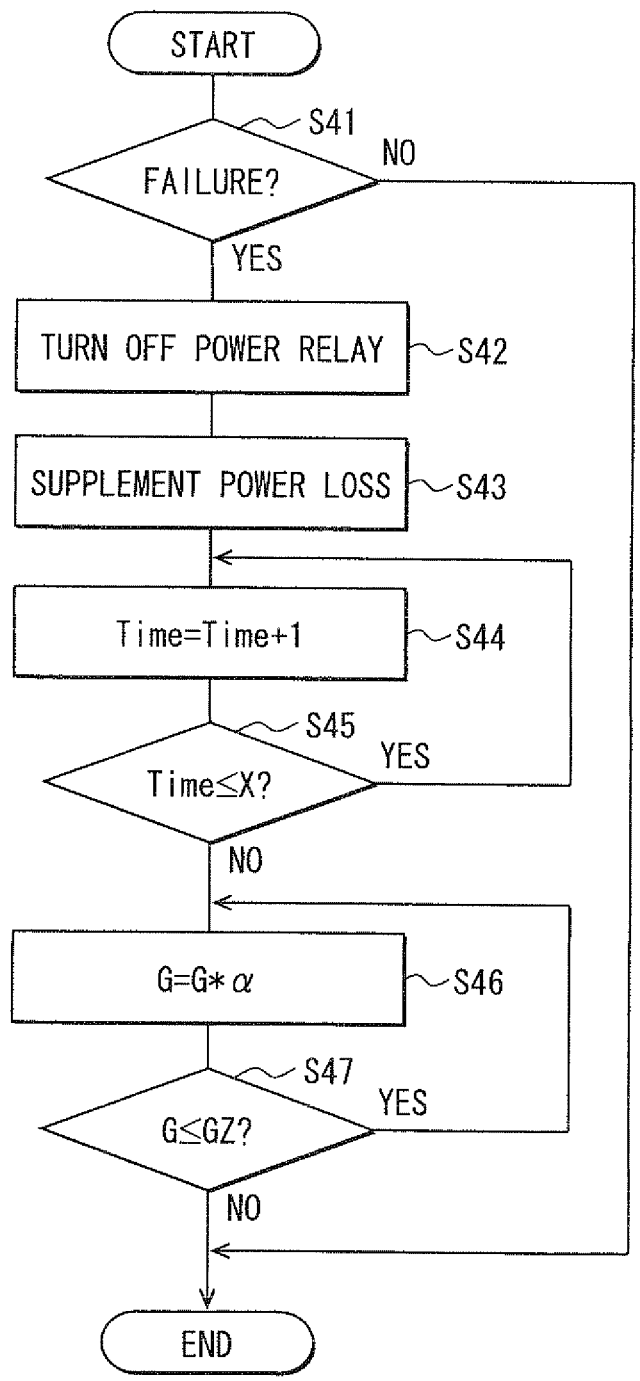
FIG. 9 is a flowchart of failure-time gradual decrease processing executed in the motor drive apparatus according to the first embodiment.
Figure 10:
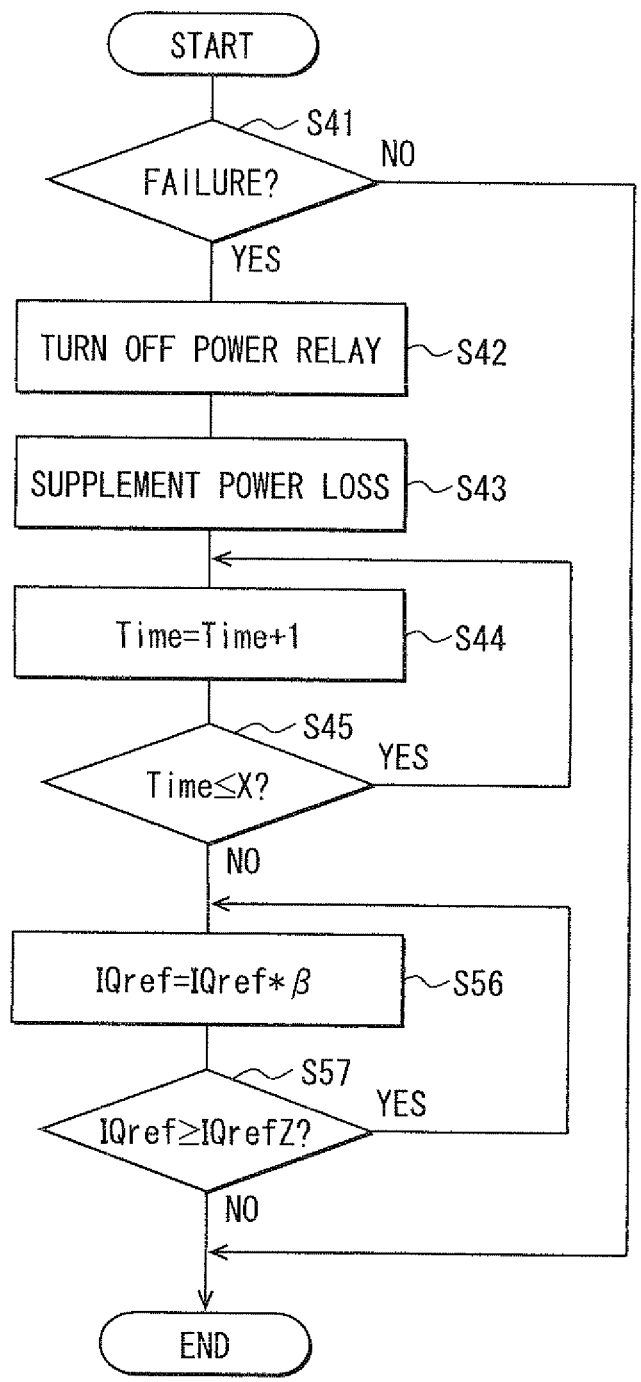
FIG. 10 is a flowchart of failure-time phase current conversion executed by the motor drive apparatus according to the second and the third embodiments.

In the first embodiment and the second embodiment, failure-time gradual reduction processing are performed in addition after time tx as shown in FIGS. 9 and 10, respectively.

S41 and S45 are the same between the two embodiments. It is assumed that the failure occurred in the first power supply system. If failure is determined at S41 by the failure check unit 451, the power relay 551 of the first power supply system, which failed, is turned off at S42 and then the loss of output power of the first power supply system is supplemented at S43 by the second power supply system, which is normal.

Subsequently, elapse of time from the time t0 of failure determination is counted. Specifically, the elapse of time Time is incremented until the counted elapse time reaches a predetermined continuation period X. For example, if the continuation period X is 5 seconds and a cycle time of execution of the relevant processing is 5 ms, the processing is repeated thousand times. The continuation period X lasts from time t0 to time tX in FIGS. 6 and 8. During this period X, as shown by (d), the inverter in the normal system outputs the phase current, which is twice as large as the current in the normal operation time (no failure time).

Then, the gradual reduction processing is executed. The gradual reduction processing is for gradually reducing the electric power, which the inverter in the normal system supplements. The gradual reduction processing is different between the first embodiment and the second embodiment. The gradual reduction processing is implemented from time tX to time tZ as shown in FIGS. 6 and 8.

In the gradual reduction processing steps S46 and S47 in the first embodiment, as shown in FIG. 9, the gain G is continuously multiplied by a multiplication factor α until a present value of the final gain G slightly exceeds the final gain GZ. The final gain GZ may be 1, for example, which is the gain in normal operation. Thus, when one of the two power supply systems fails, the gain G is doubled gradually from ½ to 1. If the multiplication factor is 1.001, the gain G is doubled by repeating multiplications about 690 times. It may alternatively be increased linearly by adding a fixed value per each processing. For example, the gain G will be gradually increased from 0.5 to 1 in 500 cycles by repeating addition of 1/500 of the initial value of the gain G at every cycle.

In the gradual reduction processing of the second embodiment, that is, S56 and S57 in FIG. 10, the q-axis current command value IQref is repetitively multiplied by a multiplication factor β until the present value of the q-axis current command value IQref is reduced to be slightly less than a q-axis current final command value IQrefZ. The q-axis current final command value IQrefZ may be set to the q-axis current command value IQref provided in the normal operation condition. Thus, when one of the two power supply systems fails, the q-axis current final command value IQrefZ is gradually halved because it is doubled from that of the normal operation time as shown by (g) in FIG. 8. If the multiplication factor β is 0.999, the q-axis current command value IQref is halved by repeating multiplications about 690 times. It may alternatively be decreased linearly by subtracting a fixed value per each processing, For example, the q-axis current command value IQref will be gradually reduced from 1 to 0.5 in 500 cycles by repeating subtraction of 1/1000 of the initial value of the q-axis current command value IQref at every cycle.

By the above reduction processing, as shown by (d) in FIGS. 6 and 8, the output current Iu2i of the inverter in the normal power supply system is gradually reduced to, for example, the value provided in the normal operation time. The total inverter output is also reduced gradually as shown by (h). Thus, any rapid operation change is suppressed after time tX. In addition, since the period, in which excessive load is applied continuously to the inverter in the normal power supply system, is shortened, the inverter is protected from overheating. Since the inverter is thus not required to have a large electric power capacity, the motor drive apparatus can be provided in compact size and low cost.

The continuation period X is not limited to 5 seconds but may be shorter. Further, time t0 is assumed to correspond to the failure check time in the embodiment, but may be set to time, at which the steering is actually being performed in spite of the failure or the steering is actually being not performed because of the failure. By thus variably setting the time t0 in accordance with vehicle conditions, uncomfortableness of a driver will be reduced.

Third Embodiment

Figure 11:
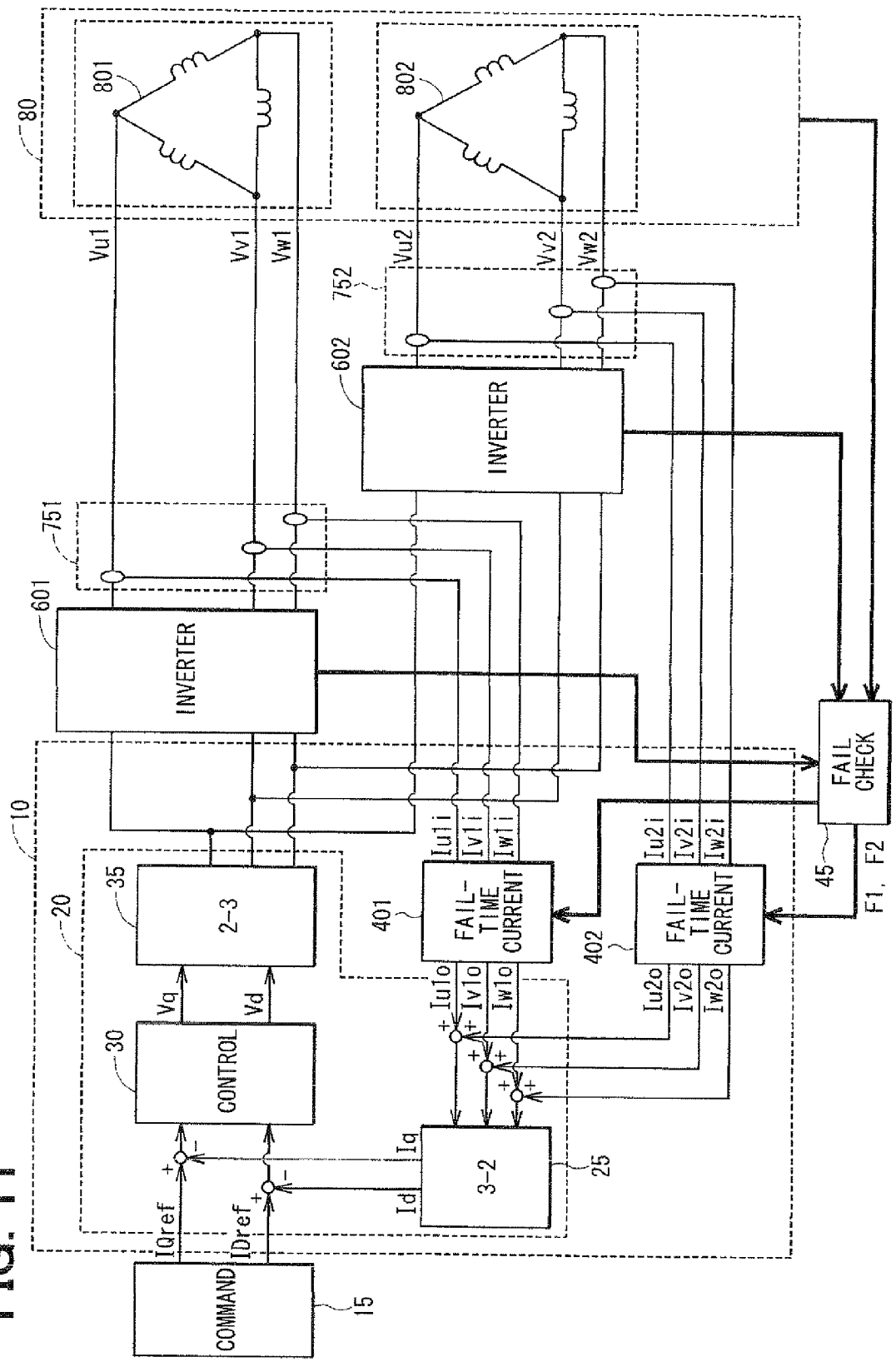
FIG. 11 is a schematic illustration of the motor drive apparatus according to the third embodiment.
Figure 12:
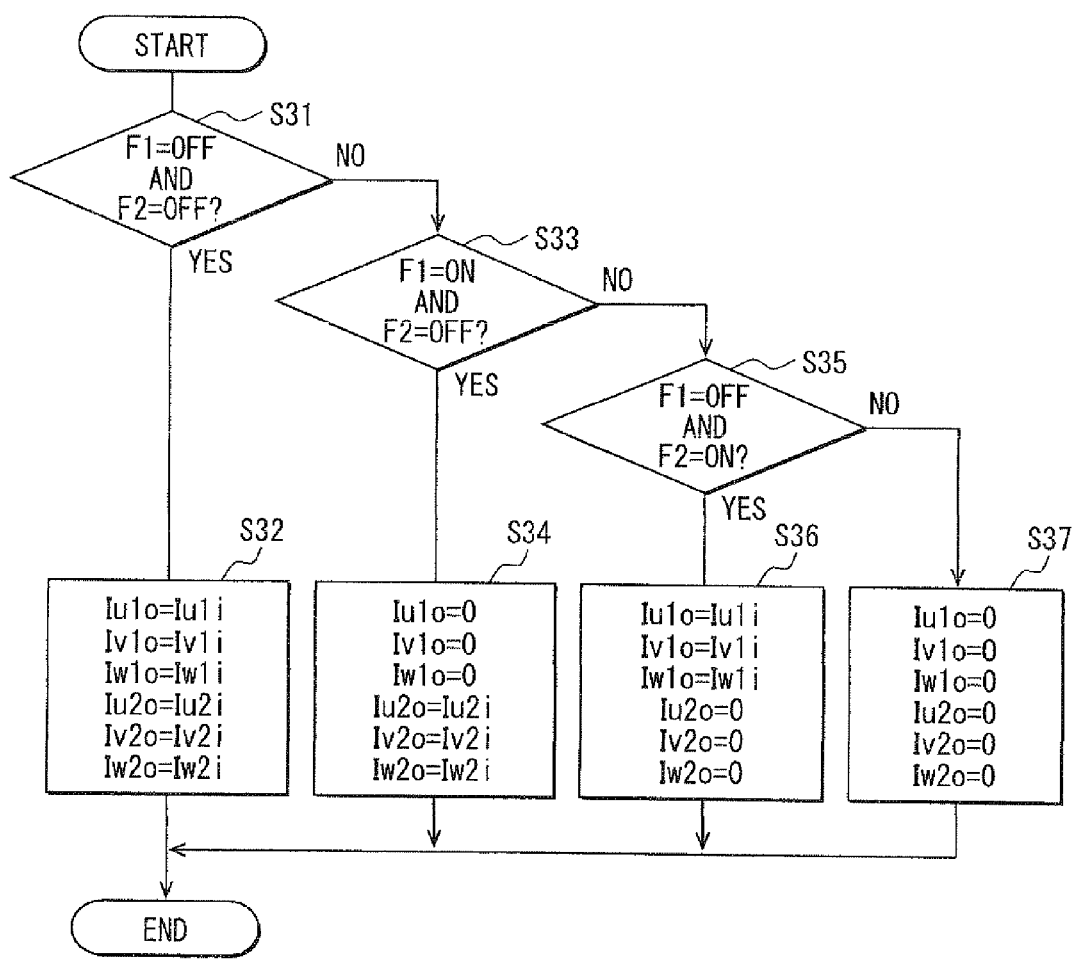
FIG. 12 is a flowchart of failure-time phase current conversion processing executed in the motor drive apparatus according to the third embodiment.
Figure 13:
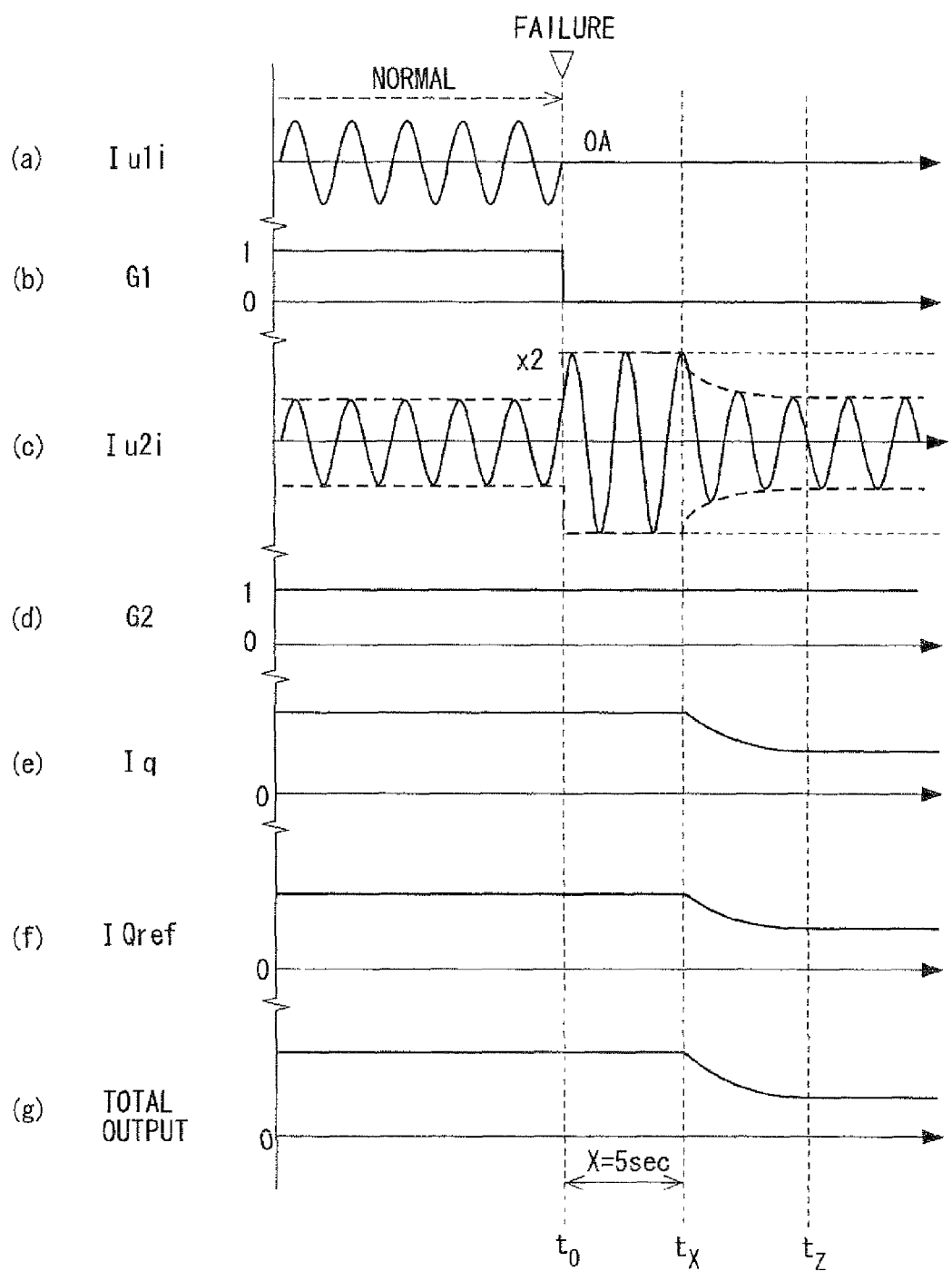
FIG. 13 is a timing diagram of operation performed by the motor drive apparatus according to the third embodiment.

The motor drive apparatus according to the third embodiment is shown in FIGS. 11, 12 and 13. In this embodiment, as shown in FIG. 12, power control units for supplying electric power to the motor winding set 801 of the first power supply system and the motor winding set 802 of the second power supply system is integrated into one power control unit 10.

The power control unit 10 includes one current control unit 20 and two inverters 601 and 602. In case of as many as N power supply systems, in which N is equal to or greater than 3, as many as N inverters 601, 602 and the like are provided in the power control unit 10 with one current control unit 20.

The function of each section is generally similar to that described with reference to the control block diagram of FIG. 2. The current command value calculation unit 15 outputs the d-axis current command value IDref and the q-axis current command value IQref. The current control calculation section 30 generates the representative two phase voltage command values Vd and Vq based on the d-axis current Id and the q-axis current Iq outputted from the 3-2 phase conversion section 25. The 2-3 phase conversion section 35 generates three-phase voltage command values from two-phase voltage command values Vd and Vq and outputs such three values to the inverters 601 and 602. The first inverter 601 supplies the three-phase AC voltages Vu1, Vv1 and Vw1 to the first motor winding set 801. The second inverter 601 similarly supplies the three-phase AC voltages Vu2, Vv2 and Vw2 to the second motor winding set 802.

The current sensor 751 detects the output current of the first inverter 601 and outputs the phase current detection values Iu1i, Iv1i and Iw1i to the failure-time phase current conversion section 401. The current sensor 752 detects the output current of the second inverter 602 and outputs the phase current detection values Iu2i, Iv2i and Iw2i to the failure-time phase current conversion section 402.

The failure check unit 45 turns off the power relay 551 (FIG. 3) of the first power supply system to interrupt the power supply and sets the failure flag F1 to F1=ON, when it is determined that at least one of the first inverter 601 and the first winding set 801 of the first power supply system is in failure. The failure check unit 45 resets the failure flag F1 to F1=OFF, when it is determined that both the first inverter 601 and the first winding set 801 are normal and has no failure. The failure flag F1=ON or F1=OFF is applied to the failure-time phase current conversion section 401 as the failure check signal.

The failure check unit 45 turns off the power relay 552 (FIG. 3) of the second power supply system to interrupt the power supply and sets the failure flag F2 to F2=ON, when it is determined that at least one of the second inverter 601 and the second winding set 802 of the second power supply system is in failure. The failure check unit 45 resets the failure flag F2 to F2=OFF, when it is determined that both the second inverter 601 and the second winding set 802 are normal and has no failure. The failure flag F2=ON or F2=OFF is applied to the failure-time phase current conversion section 402 as the failure check signal.

The failure-time phase current conversion section 401 converts the inputted phase current detection values Iu1i, Iv1i and Iw1i to the phase current conversion values Iu1o, Iv1o, Iw1o based on the failure check signal, respectively, and outputs such conversion values to the 3-2 phase conversion section 25. The failure-time phase current conversion section 402 converts the inputted phase current detection values Iu2i, Iv2i and Iw2i to the phase current conversion values Iu2o, Iv2o and Iw2o based on the failure check signal, respectively, and outputs such conversion values to the section 25. The coefficient of this conversion is referred to as the gain, which is a ratio of the phase current conversion value relative to the phase current detection value. These phase current conversion values are added with respect to each phase. The sum of the output currents are inputted to the 3-2 phase conversion section 25 to be subjected to coordinate conversion.

The failure-time phase current conversion is executed as shown in FIG. 12 in case that only one current control section is provided in the two-system motor drive apparatus.

At S31, it is checked whether the first power supply system is normal (F1=OFF) and the second power supply system is normal (F2=OFF). If the check result is YES, the gains G of the first power supply system and the second power supply system are both set to 1 at S32 so that the phase current conversion values are set to be equal to the phase current detection values and outputted. If the check result at S31 is NO, S33 is executed.

At S33, it is checked whether the first power supply system is in failure (F1=ON) and the second power supply system is normal (F2=OFF). If the check result at S33 is YES, the gain G1 for the first power supply system is set to 0 at S34 so that the phase current conversion values Iu1o, Iv1o and Iw1o are all set to 0. The gain G2 for the second power supply system is set to 1 so that the phase current conversion values Iu2o, Iv2o and Iw2o are all set to be equal to the phase current detection values Iu2i, Iv2i and Iw2i, respectively. Thus, the sum of the phase current conversion values inputted to the 3-2 phase conversion section 25 becomes one-half of a sum, which is provided in the normal operation time. If the check result at S33 is NO, S35 is executed.

At S35, it is checked whether the first power supply system is normal (F1=OFF) and the second power supply system is in failure (F2=ON). If the check result at S35 is YES, the gain G1 for the first power supply system is set to 1 at S36 so that the phase current conversion values Iu1o, Iv1o and Iw1o are all set to be equal to the phase current detection values Iu1i, Iv1i and The gain G2 for the second power supply system is set to 0 so that the phase current conversion values Iu2o, Iv2o and Iw2o are all set to 0. Thus, the sum of the phase current conversion values inputted to the 3-2 phase conversion section 25 becomes one-half of a sum, which is provided in the normal operation time.

If the check result at S35 is NO, it is determined that both the first power supply system and the second power supply system are in failure. In this case, both gains G are set to 0 at S37 so that all the phase current conversion values are set to 0.

As exemplified above, in case of failure in one of the two power supply systems of power supply systems, the sum of the phase current conversion values inputted to the 3-2 phase conversion section 25 is set to one-half of the sum provided in the normal operation time.

The operation of the third embodiment, in which only one current control section is provided for the two-system motor drive apparatus, is shown in FIG. 13. FIG. 13 specifically shows changes in various parameters at the time of failure, assuming that failure arises in the U-phase of the first power supply system. In FIG. 13, it is assumed that the failure check unit 45 determines failure at time t0.

Upon occurrence of failure in the first power supply system, the phase current detection value Iu1i and the gain G1 change as shown by (a) and (b), respectively. When the failure check unit 451 detects failure in the first inverter 601 or the first winding set 801 at time to, the power relay 551 turns off to interrupt the power supply. As a result, the phase current detection value Iu1i changes to 0 as shown by (a). The phase current detection values are not used. That is, the gain G1 is set to 0 as shown by (b).

As described in FIG. 12, the sum of the phase current conversion values inputted to the 3-2 phase conversion section 25 is halved in comparison to the sum of the normal operation time. The 3-2 phase conversion section 25 thus recognizes that no current flows in the failure system and feeds back to the current control calculation section 30 the information, which indicates that only one-half of the current of the normal operation time flows. The current control calculation section 30 outputs a command to increase the current to supplement the insufficient current. At this time, since the electric power supply to the first power supply system, which is in failure, is interrupted by the power relay 551, the output of the 2-3 phase conversion section 35 is all supplied to the second power supply system, which has no failure. As a result, as shown by (c), the phase current Iu2i, which flows in the second power supply system, is doubled in comparison to the current, which flows in the normal operation time. The gain G2 is not changed as shown by (d).

The q-axis current Iq and the q-axis current command value IQref are maintained before and after time t0 as shown by (e) and (f), respectively. In the similar manner as in the first embodiment and the second embodiment, the electric power having been supplied by the first inverter 601 of the first power supply system, which failed, is supplemented by the second inverter 601 of the second power supply system. Thus, the total inverter output is maintained before and after the occurrence of failure as shown by (g). Changes in operation of the motor drive apparatus are thus minimized even upon occurrence of failure.

Further, no additional power control unit need be provided separately for the failure time. It is only required to change the input value inputted in the current control calculation section from the value used in the normal operation time. The third embodiment can thus provide by only one d-axis control section the similar operation and function of the first embodiment and the second embodiment, in which two d-axis control sections are provided for the two power supply systems. Thus, fail-safe control is implemented by a microcomputer without complication.

In the third embodiment, the motor drive apparatus is assumed to have two power supply systems and one system is assumed to be in failure. With this assumption, the sum of the phase current conversion values inputted to the 3-2 phase conversion section 25 is set to ½ of the sum of the normal operation time. It is further assumed here that as many as M systems fail to operate normally among as many as N systems. M is an integer, which is equal to or greater than 1 but less than N. N is also an integer equal to or greater than 2. If all the power supply systems are normal, M is 0. When M power supply systems fail among N systems, the sum of the phase current conversion values inputted to the 3-2 phase conversion section 25 is determined to (N−M)/N of the sum of the normal time. Except a case of no failure (M=0), the 3-2 phase conversion section 25 is enabled to recognize that the total amount of currents of the total power supply systems is insufficient and feeds back such recognition to the current control calculation section 30. The current control calculation section 30 commands to increase the current to compensate for the loss of electric power. Since the power supply to the failure power supply systems are interrupted by the power relays, the output of the 2-3 phase conversion section 35 is all supplied to the normal power supply systems, the number of which is (N−M). As a result, the phase current of N/(N−M) times of that of the normal operation time flows in each of the normal power supply systems. The total current, which flows in a case of failure in some (M) of the power supply systems equals in the end to the total current, which flows in a case of no failure in all the power supply systems (N). The sum of the inverter outputs is thus maintained at the same level before and after the occurrence of the failure.

The third embodiment can thus provide by only one current control unit the similar operation and function of the first embodiment and the second embodiment, in which as many as N current control units are provided for the N power supply systems.

In the third embodiment, the gradual reduction processing is executed in generally the similar manner as in the second embodiment. That is, in the gradual reduction processing of the second embodiment, that is, S56 and S57 in FIG. 10, the q-axis current command value IQref is repetitively multiplied by the multiplication factor β until the present value of the q-axis current command value IQref is reduced to be slightly less than the q-axis current final command value IQrefZ. However, in the third embodiment, the q-axis current command value IQref is maintained at the same value as the normal operation time as shown by (f) in FIG. 13, when one of the two power supply systems fails. Therefore, the third embodiment is different from the second embodiment in that the q-axis current final command value IQrefZ is set to be one-half of that of the normal operation time. By gradually decreasing the present value of the q-axis current command value IQref to the predetermined q-axis current final command value IQrefZ, both the q-axis current Iq and the total inverter output are also gradually reduced as shown by (e) and (g) in FIG. 13, respectively.

Thus, any rapid operation change is suppressed after time tX by the gradual reduction processing in the similar manner as in the first embodiment and the second embodiment. In addition, since the period, in which excessive load is applied continuously to the inverter in the normal system, is shortened, the inverter is protected from overheating. Since the inverter is not required to have a large electric power capacity, the motor drive apparatus can be provided in compact size and low cost.

The present invention is not limited to the disclosed embodiments but may be implemented in various other embodiments.

What is claimed is:

1. A motor drive apparatus for driving a motor with electric power supplied by a DC power source, the motor drive apparatus comprising:
 a plurality of power supply systems, each of which includes an inverter for converting the electric power of the DC power source to AC power and a winding set of the motor for receiving the AC power from the inverter;
 a failure check unit configured to check whether the plurality of power supply systems includes a failure system, in which at least one of the inverter and the winding set is in failure;
 a power supply interruption unit configured to interrupt supply of power from the DC power source to the inverter of the failure system in response to a failure determination by the failure check unit; and
 a power control unit configured to supply the electric power to the inverter based on an input current command value at a normal operation time, wherein:
 the power control unit is further configured to control the inverter of a normal system, which is other than the failure system in the plurality of power supply systems, to supplement electric power, which the failure system has supplied, by the inverter of the normal system, when the power supply interruption unit interrupts the power supply to the inverter of the failure system,
 the power control unit is further configured to control the inverter of the normal system to gradually change the electric power supplied by the inverter of the normal system after supplementing the power supply is started,
 the power control unit is configured to change an input value inputted to the power control unit from an input value inputted at the normal operation time after the failure determination by the failure check unit so that the electric power having been supplied by the inverter of the failure system is supplemented b the inverter of the normal system, and
 the power control unit is configured to control the inverter of the normal system to gradually reduce the electric power, which the inverter of the normal system supplements, after an elapse of a predetermined period from the failure determination by the failure check unit.

2. The motor drive apparatus according to claim 1, wherein:
 the plurality of power supply systems includes as many as N power supply systems;
 the power control unit includes a failure-time phase current conversion section and a current control unit;
 the failure-time phase current conversion section is configured to convert a phase current detection value of each phase of the motor, which is detected by a phase current detection section, to a phase current conversion value based on the failure determination of the failure check unit;
 the current control unit is configured to convert the phase current conversion value to a d-axis current and a q-axis current and control an output of the inverter based on converted values and the input current command value; and
 the current control unit is configured to control the inverter of the normal system to supply a current, which supplements the electric power having been supplied by the inverter of the failure system, when as many as M power supply systems among the N power supply systems are determined to be failure power supply systems and the power supply to the failure power supply systems is interrupted by the power supply interruption unit.

3. The motor drive apparatus according to claim 2, wherein:
the power control unit includes as many as N current control units; and
the power control unit is configured to set a gain, which is a ratio of the phase current conversion value relative to the phase current detection value of the normal system, to (N−M)/N, thereby controlling the inverter of the normal system to supply the current, which has been supplied by the inverter of the failure system, in accordance with the gain, when the failure is determined by the failure check unit.

4. The motor drive apparatus according to claim 2, wherein:
the power control unit includes as many as N current control units; and
the power control unit is configured to output the current command value by multiplying by N/(N−M) to the inverter of the normal system, thereby controlling the inverter of the normal system to supply the current, which has been supplied by the inverter of the failure system, when the failure is determined by the failure check unit.

5. The motor drive apparatus according to claim 2, wherein:
the power control unit includes only one current control unit, which is configured to recognize that no current flows in the failure system and output a command by multiplying the input value by N/(N−M) to supply the current to supplement the insufficient current thereby controlling the inverter of the normal system to supply the current, which has been supplied by the inverter of the failure system, when the failure is determined by the failure check unit.

6. The motor drive apparatus according to claim 1, wherein:
the power control unit is configured to gradually reduce a current limit value, which is set as an upper limit value of the current command value in response to the failure determination by the failure check unit.

7. The motor drive apparatus according to claim 3, wherein:
the power control unit is configured to control the inverter of the normal system to gradually reduce the electric power, which the inverter of the normal system supplements, by gradually increasing the gain, after an elapse of a predetermined period from the failure determination by the failure check unit.

8. The motor drive apparatus according to claim 4, wherein:
the power control unit is configured to control the inverter of the normal system to gradually reduce the electric power, which the inverter of the normal system supplements, by gradually reducing the current command value outputted to the inverter of the normal system, after an elapse of a predetermined period from the failure determination by the failure check unit.

9. The motor drive apparatus according to claim 5, wherein:
the power control unit is configured to control the inverter of the normal system to gradually reduce the electric power, which the inverter of the normal system supplements, by gradually reducing the current command value outputted to the inverter of the normal system, after an elapse of a predetermined period from the failure determination by the failure check unit.

10. The motor drive apparatus according to claim 1, wherein:
the motor is provided in an electric power steering system of a vehicle.

11. A motor drive apparatus for driving a motor with electric power supplied by a DC power source, the motor drive apparatus comprising:
a plurality of power supply systems, each of which includes an inverter for converting the electric power of the DC power source to AC power and a winding set of the motor for receiving the AC power from the inverter;
a failure check unit configured to check whether the plurality of power supply systems includes a failure system, in which at least one of the inverter and the winding set is in failure;
a power supply interruption unit configured to interrupt supply of power from the DC power source to the inverter of the failure system in response to a failure determination by the failure check unit; and
a power control unit configured to supply the electric power to the inverter based on an input current command value at a normal operation time; wherein:
the power control unit is further configured to control the inverter of a normal system, which is other than the failure system in the plurality of power supply systems, to supplement electric power, which the failure system has supplied, by the inverter of the normal system, when the power supply interruption unit interrupts the power supply to the inverter of the failure system;
the power control unit is further configured to control the inverter of the normal system to gradually change the electric power supplied by the inverter of the normal system after supplementing the power supply is started;
the plurality of power supply systems includes as many as N power supply systems;
the power control unit includes a failure-time phase current conversion section and a current control unit;
the failure-time phase current conversion section is configured to convert a phase current detection value of each phase of the motor, which is detected by a phase current detection section, to a phase current conversion value based on the failure determination of the failure check unit;
the current control unit is configured to convert the phase current conversion value to a d-axis current and a q-axis current and control an output of the inverter based on converted values and the input current command value;
the current control unit is configured to control the inverter of the normal system to supply a current, which supplements the electric power having been supplied by the inverter of the failure system, when as many as M power supply systems among the N power supply systems are determined to be failure power supply systems and the power supply to the failure power supply systems is interrupted by the power supply interruption unit;
the power control unit includes as many as N current control units;
the power control unit is configured to set a gain, which is a ratio of the phase current conversion value relative to the phase current detection value of the normal system, to (N−M)/N, thereby controlling the inverter of the normal system to supply the current, which has been supplied by the inverter of the failure system, in accordance with the gain, when the failure is determined by the failure check unit; and the power control unit is configured to control the inverter of the normal system to gradually reduce the electric power, which the inverter of the normal system supplements, by gradually increasing the gain, after an elapse of a predetermined period from the failure determination by the failure check unit.

12. A motor drive apparatus for driving a motor with electric power supplied by a DC power source, the motor drive apparatus comprising:

a plurality of power supply systems, each of which includes an inverter for converting the electric power of the DC power source to AC power and a winding set of the motor for receiving the AC power from the inverter;

a failure check unit configured to check whether the plurality of power supply systems includes a failure system, in which at least one of the inverter and the winding set is in failure;

a power supply interruption unit configured to interrupt supply of power from the DC power source to the inverter of the failure system in response to a failure determination by the failure check unit; and a power control unit configured to supply the electric power to the inverter based on an input current command value at a normal operation time; wherein:

the power control unit is further configured to control the inverter of a normal system, which is other than the failure system in the plurality of power supply systems, to supplement electric power, which the failure system has supplied, by the inverter of the normal system, when the power supply interruption unit interrupts the power supply to the inverter of the failure system;

the power control unit is further configured to control the inverter of the normal system to gradually change the electric power supplied by the inverter of the normal system after supplementing the power supply is started;

the plurality of power supply systems includes as many as N power supply systems;

the power control unit includes a failure-time phase current conversion section and a current control unit;

the failure-time phase current conversion section is configured to convert a phase current detection value of each phase of the motor, which is detected by a phase current detection section, to a phase current conversion value based on the failure determination of the failure check unit;

the current control unit is configured to convert the phase current conversion value to a d-axis current and a q-axis current and control an output of the inverter based on converted values and the input current command value;

the current control unit is configured to control the inverter of the normal system to supply a current, which supplements the electric power having been supplied by the inverter of the failure system, when as many as M power supply systems among the N power supply systems are determined to be failure power supply systems and the power supply to the failure power supply systems is interrupted by the power supply interruption unit;

the power control unit includes as many as N current control units;

the power control unit is configured to output the current command value by multiplying by N/(N−M) to the inverter of the normal system, thereby controlling the inverter of the normal system to supply the current, which has been supplied by the inverter of the failure system, when the failure is determined by the failure check unit; and the power control unit is configured to control the inverter of the normal system to gradually reduce the electric power, which the inverter of the normal system supplements, by gradually reducing the current command value outputted to the inverter of the normal system, after an elapse of a predetermined period from the failure determination by the failure check unit.

13. A motor drive apparatus for driving a motor with electric power supplied by a DC power source, the motor drive apparatus comprising:

a plurality of power supply systems, each of which includes an inverter for converting the electric power of the DC power source to AC power and a winding set of the motor for receiving the AC power from the inverter;

a failure check unit configured to check whether the plurality of power supply systems includes a failure system, in which at least one of the inverter and the winding set is in failure;

a power supply interruption unit configured to interrupt supply of power from the DC power source to the inverter of the failure system in response to a failure determination by the failure check unit; and a power control unit configured to supply the electric power to the inverter based on an input current command value at a normal operation time; wherein:

the power control unit is further configured to control the inverter of a normal system, which is other than the failure system in the plurality of power supply systems, to supplement electric power, which the failure system has supplied, by the inverter of the normal system, when the power supply interruption unit interrupts the power supply to the inverter of the failure system;

the power control unit is further configured to control the inverter of the normal system to gradually change the electric power supplied by the inverter of the normal system after supplementing the power supply is started;

the plurality of power supply systems includes as many as N power supply systems;

the power control unit includes a failure-time phase current conversion section and a current control unit;

the failure-time phase current conversion section is configured to convert a phase current detection value of each phase of the motor, which is detected by a phase current detection section, to a phase current conversion value based on the failure determination of the failure check unit;

the current control unit is configured to convert the phase current conversion value to a d-axis current and a q-axis current and control an output of the inverter based on converted values and the input current command value;

the current control unit is configured to control the inverter of the normal system to supply a current, which supplements the electric power having been supplied by the inverter of the failure system, when as many as M power supply systems among the N power supply systems are determined to be failure power supply systems and the power supply to the failure power supply systems is interrupted by the power supply interruption unit;

the power control unit includes only one current control unit, which is configured to recognize that no current flows in the failure system and output a command by multiplying the input value by N/(N−M) to supply the current to supplement the insufficient current thereby controlling the inverter of the normal system to supply the current, which has been supplied by the inverter of the failure system, when the failure is determined by the failure check unit; and the power control unit is configured to control the inverter of the normal system to gradually reduce the electric power, which the inverter of the normal system supplements, by gradually reducing the current command value outputted to the inverter of the normal system, after an elapse of a predetermined period from the failure determination by the failure check unit.

* * * * *